(12) United States Patent
Shiomi et al.

(10) Patent No.: US 6,517,329 B2
(45) Date of Patent: Feb. 11, 2003

(54) ELECTROMAGNETIC BLOWER AND TWO-PASSAGE AIR SUPPLY APPARATUS

(75) Inventors: Iwaji Shiomi, Tokyo (JP); Nobuyuki Nozawa, Tokyo (JP); Akira Takanaka, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 09/844,375

(22) Filed: Apr. 27, 2001

(65) Prior Publication Data

US 2001/0027087 A1 Oct. 4, 2001

Related U.S. Application Data

(63) Continuation of application No. PCT/JP99/05993, filed on Oct. 28, 1999.

(30) Foreign Application Priority Data

Oct. 28, 1998 (JP) ............................................. 10-307069

(51) Int. Cl.[7] .......................... F04B 17/00; F04B 49/00; F04B 39/00; B10D 12/00
(52) U.S. Cl. ....................... 417/413.1; 417/12; 417/28; 417/313; 210/532.2
(58) Field of Search .......................... 417/12, 28, 313, 417/413.1; 210/532.2, 221.2

(56) References Cited

U.S. PATENT DOCUMENTS

| | | | | |
|---|---|---|---|---|
| 3,327,633 A | * | 6/1967 | Duinker et al. | 417/413.1 |
| 4,317,723 A | * | 3/1982 | Rapp et al. | 210/202 |
| 4,421,643 A | * | 12/1983 | Frederick | 210/138 |
| 4,992,165 A | * | 2/1991 | Jensen | 210/124 |
| 5,006,232 A | * | 4/1991 | Lidgitt et al. | 210/104 |
| 5,104,298 A | * | 4/1992 | Takahashi et al. | 310/17 |
| 5,792,355 A | * | 8/1998 | Desjardins | 210/605 |

FOREIGN PATENT DOCUMENTS

| | | | | |
|---|---|---|---|---|
| JP | 51-90104 U | 7/1976 | | |
| JP | 2-11876 A | 1/1990 | | |
| JP | 2-64278 A | 3/1990 | | |
| JP | 8-187496 A | 7/1996 | | |
| JP | 9-192682 A | 7/1997 | | |
| JP | 9-308587 A | 12/1997 | | |
| JP | 05-57295 | * 3/1998 | ............. | C02F/3/00 |
| JP | 10-137517 A | 5/1998 | | |

* cited by examiner

Primary Examiner—Cheryl J. Tyler
Assistant Examiner—Timothy P. Solak
(74) Attorney, Agent, or Firm—Pennie & Edmonds LLP

(57) ABSTRACT

Provided is a low-noise, long-life electromagnetic blower that has a simple, low-priced configuration and can realize two different outputs, high and low. When the electromagnetic blower is operated with low output, coils of an electromagnet are connected in series with each other, and an alternating current is supplied from an AC power source. When the blower is operated with high output, on the other hand, current is supplied to the one coil only. In the case where the electromagnetic blower is used for sewage disposal, the electromagnetic blower is operated with low output during aeration and with high output during reverse cleaning operation. Thereupon, the electromagnetic blower can operate with low noise during aeration, and the efficiency of reverse cleaning can be improved. In order to operate the electromagnetic blower with high output, moreover, the coils of the electromagnet may be connected in parallel with each other.

3 Claims, 5 Drawing Sheets

ELECTROMAGNETIC BLOWER AND TWO-PASSAGE AIR SUPPLY APPARATUS

CROSS-REFERENCE TO RELATED APPLICATIONS

This is a Continuation Application of PCT Application No. PCT/JP99/05993, filed Oct. 28, 1999, which was not published under PCT Article 21(2) in English.

This application is based upon and claims the benefit of priority from the prior Japanese Patent Application No. 10-307069, filed Oct. 28, 1998, the entire contents of which are incorporated herein by reference.

BACKGROUND OF THE INVENTION

The present invention relates to an electromagnetic blower and a two-passage air supply apparatus using the same, and more particularly, to an electromagnetic blower with a simple, low-priced configuration, capable of singly changing its delivery of air in a multistage manner, and a two-passage air supply apparatus using the same.

As much importance has recently been attached to the problem of environmental health, septic tanks for purifying sewage, resources of water as one of surroundings, have been spreading. As shown in FIG. 9A, a septic tank 50 comprises a first settling-separating tank 51 and a second settling-separating tank 52 to be supplied with, e.g., sewage, a biological contact aeration tank 53 to be supplied with the sewage that is cleared of solid matter and the like in the settling-separating tanks 51 and 52, and a settling tank 54 for settling a mass (sludge) of microorganisms having purified the sewage in the biological contact aeration tank 53. Clear supernatant water in the settling tank 54 is disinfected and discharged through an outlet.

The biological contact aeration tank is provided with a contact filter medium 53a. Aerobic microbe on the surface of the contact filter medium 53a are propagated by aerating air that is fed from a first blower 61 through a pipe 62 and an air diffuser pipe 63, and decompose organisms in the sewage. In order to clean the contact filter medium 53a in the biological contact aeration tank, moreover, reverse cleaning air is loaded periodically or nonperiodically from a second blower 64 into the contact filter medium 53a through a pipe 65 and an air diffuser pipe 66 for a given short time of each day, for example.

In the conventional apparatus described above, however, the aerating air and the reverse cleaning air are supplied individually from the separate blowers, so that the two blowers are need and entail high cost. To cope with this problem, one blower is proposed singly to form aerating air and reverse cleaning air.

FIG. 9B shows one such blower. The configuration of a septic tank 50 in the drawing is identical with the one shown in FIG. 9A. In this apparatus, a blower 67 is connected to a three-way switching valve 68, and air discharged from the blower 67 is used as the aerating air, normally. When it is time for the reverse cleaning air to be supplied, the three-way switching valve 68 is switched so that the air discharged from the blower 67 serves as the reverse cleaning air for a given time.

As another prior art example, a valve 69 is provided in the middle of a path of supply for reverse cleaning air, as shown in FIG. 9C. When it is time for the reverse cleaning air to be supplied, the valve 69 is opened so that the air discharged from the blower 67 serves as the reverse cleaning air for a given time.

A technique related to the present invention is disclosed in Jpn. Pat. Appln. KOKAI Publication No. 8-187496, for example. According to the technique described in this publication, first and second air compressors are arranged, and compressed air from the first air compressor is guided to first and second hoses through a three-way switching valve that is switched by means of compressed air from the second air compressor. By doing this, air is fed to the first hose to perform aeration, normally. When it is time for reverse cleaning to be started, the second air compressor is actuated to switch the three-way switching valve, and the compressed air from the first air compressor is connected to a hose for reverse cleaning.

According to the examples shown in FIGS. 9B and 9C, the aerating air and the reverse cleaning air can be formed by means of the single blower. Since the blower is always driven with its rated output (high output), however, there are problems of high-level noise from the blower and short life.

In the example shown in FIG. 9B, moreover, the pressure in the air diffuser pipe 63 for aeration is lower than the water pressure while the reverse cleaning air is being supplied to the contact filter medium 53a, so that water that contains sludge in the biological contact aeration tank 53 flows back into the air diffuser pipe 63 for aeration, thereby clogging the pipe. In the example shown in FIG. 9C, furthermore, air pressure for aeration is halved during reverse cleaning operation, so that air pressure for reverse cleaning is about half as high as the air pressure for aeration. Thus, the air pressure is low, and the efficiency of reverse cleaning is poor.

BRIEF SUMMARY OF THE INVENTION

The object of the present invention is to provide a low-noise, long-life electromagnetic blower that is free from the above problems, has a simple, low-priced configuration, and can realize two different outputs, high and low.

In order to achieve the above object, according to the present invention, there is provided an electromagnetic blower including an electromagnet wound with a coil, a vibrator capable of being reciprocated by means of the magnetic force of the electromagnet generated by an alternating current supplied to the coil, and a diaphragm attached to an end portion of the vibrator, and designed so that compressed air is discharged as the diaphragm is actuated. The blower comprises switching means for allowing the alternating current to be supplied to only a part of the coil, and has a first feature in that a first mode in which the alternating current is supplied to the coil or a second mode in which the alternating current is supplied to only a part of the coil can be selected by controlling the switching means.

According to this feature, the electromagnetic blower can be operated with nonrated low output (aforesaid first mode) and rated high output (aforesaid second mode) with use of only the simple switching means. If the time for the operation with the low output is made longer than the time for the operation with the high output, the level of noise produced by the electromagnetic blower can be lowered, and the life of the electromagnetic blower can be lengthened.

Further, the present invention has a second feature in that the compressed air discharged from the electromagnetic blower is alternatively supplied to an air diffuser pipe for aeration for sewage purification and an air diffuser pipe for reverse cleaning through a switching pipe, that the electromagnetic blower is operated in the first mode during aeration and in the second mode during reverse cleaning operation, and that a throttle valve is connected between pipes for guiding the compressed air discharged from the electromagnetic blower to the air diffuser pipe for aeration and the air diffuser pipe for reverse cleaning.

According to this feature, the electromagnetic blower is operated with low output during aeration and with high output during reverse cleaning operation, so that it can operate with low noise during aeration, and its life can be lengthened. Since the throttle valve is connected between the pipes for guiding the compressed air to the air diffuser pipe for aeration and the air diffuser pipe for reverse cleaning, moreover, the internal pressure of the other air diffuser pipe cannot become lower than the water pressure while the compressed air is being supplied to one of the air diffuser pipes for aeration and reverse cleaning, so that sewage can be prevented from flowing back into the other air diffuser pipe. Thus, the air diffuser pipes can be prevented from being clogged with sewage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
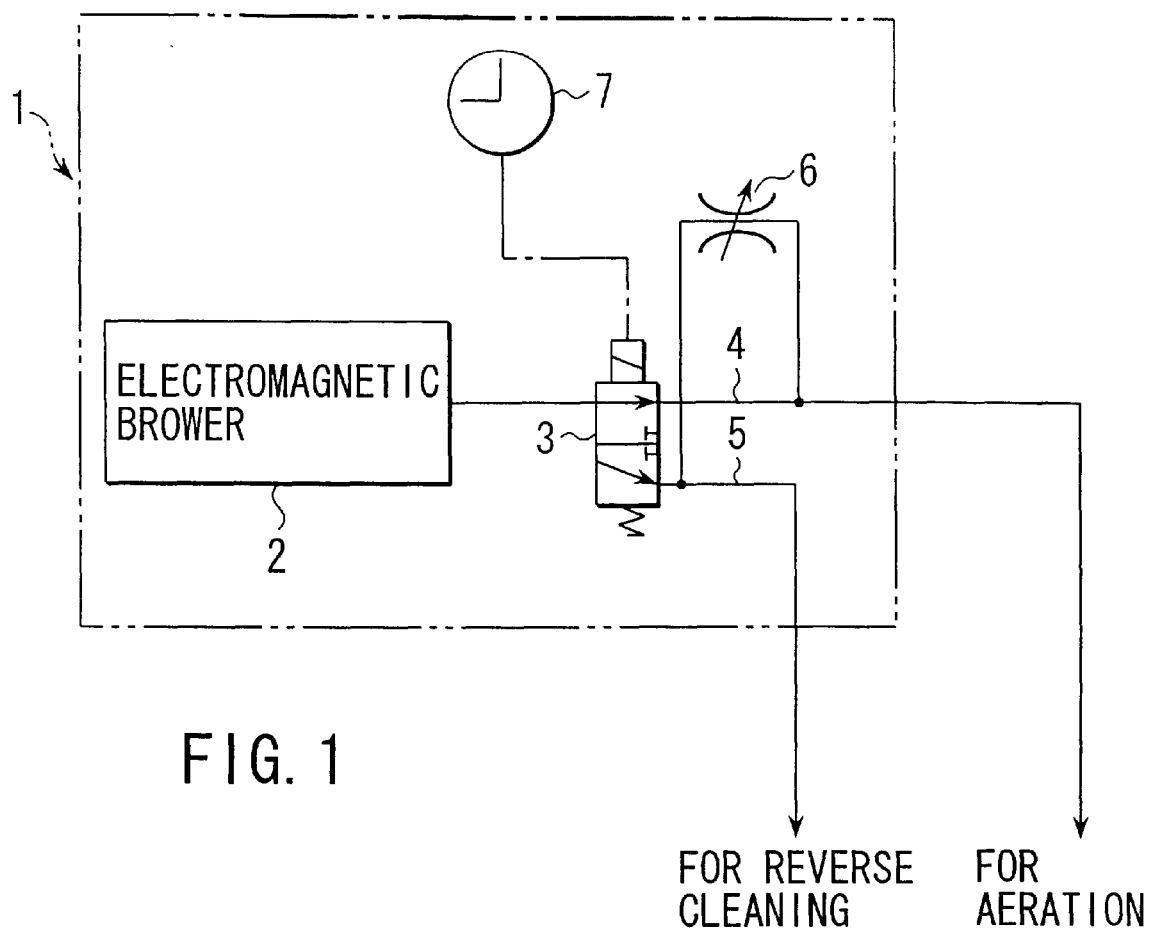
FIG. 1 is a diagram shown an outline of a two-passage air supply apparatus according to one embodiment of the present invention.

The present invention will now be described in detail with reference to the drawings. FIG. 1 is a schematic view of one embodiment of a two-passage air supply apparatus of the present invention, FIG. 2 is a cutaway front view showing a configuration of an electromagnetic blower of the present invention, and FIGS. 3A and 3D are diagrams for illustrating a configuration of a principal part of the electromagnetic blower.

As shown in FIG. 1, a two-passage air supply apparatus 1 comprises a novel electromagnetic blower 2 proposed according to the present invention, a three-way change-over valve 3, an aerating pipe 4 and a reverse cleaning pipe 5 that are connected to the three-way change-over valve 3, a throttle valve 6 connected between the aerating pipe 4 and the reverse cleaning pipe 5, and a timer 7. Preferably, the three-way change-over valve 3 is composed of a three-port solenoid valve. The three-way change-over valve 3 is controlled so that compressed air from the electromagnetic blower 2 is connected to the aerating pipe 4 when aerating air is to be supplied and to the reverse cleaning pipe 5 when reverse cleaning air is to be supplied, in a manner such that current from a power source (not shown) is turned off when the aerating air is to be supplied and on when the reverse cleaning air is to be supplied, for example, in response to a control signal from the timer 7.

Figure 2:
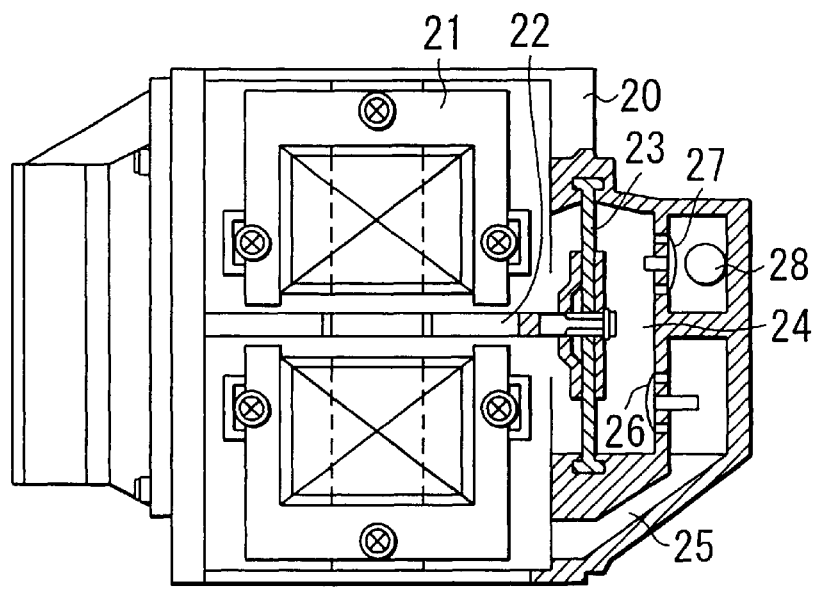
FIG. 2 is a cutaway front view showing a configuration of an electromagnetic blower according to one embodiment of the present invention.
Figure 3A:
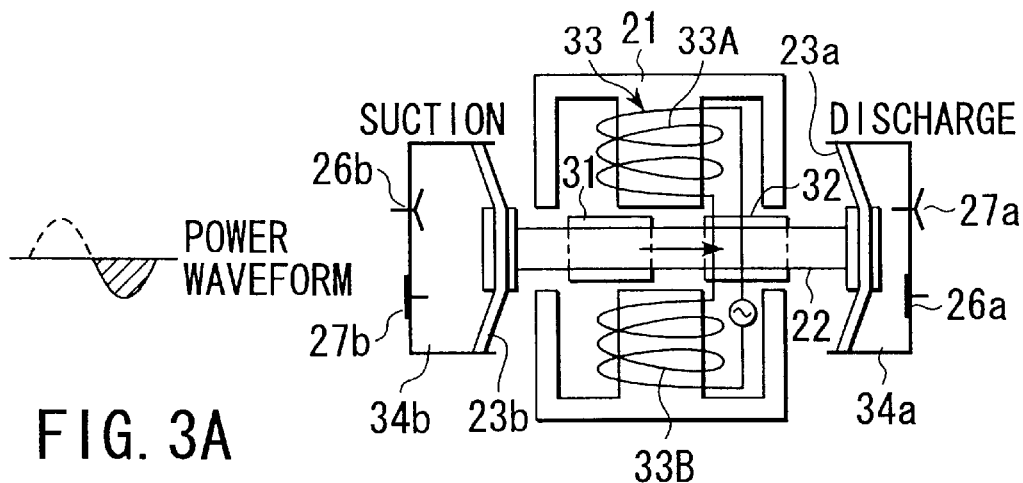
FIGS. 3A and 3B are diagrams for illustrating a configuration and operation of a principal part of the electromagnetic blower.

The electromagnetic blower 2 has the configuration shown in FIG. 2. Since the electromagnetic blower 2 has a symmetrical configuration, the configuration of its right-hand half will be described with reference to the sectional view. An electromagnet 21 is provided in the central portion of an enclosure 20 of the electromagnetic blower 2, and a vibrator 22 is provided penetrating the center of the electromagnet 21. Fixed to each of the opposite end portions of the vibrator 22 is the central portion of a diaphragm 23, the peripheral portion of which is supported by means of the enclosure 20. Arranged in an air chamber 24 outside the diaphragm 23 are a suction valve 26 for sucking in air through a suction port 25 and a discharge valve 27 for discharging compressed air. The compressed air discharged through the discharge valve 27 is discharged through a discharge port 28.

The configuration of the principal part of the electromagnetic blower 2 will now be described with reference to FIGS. 3A and 3B. Permanent magnets 31 and 32 are fixed to two portions of the vibrator 22 at a suitable space in the axial direction thereof. When an alternating current is supplied to a coil 33 that is wound around the core of the electromagnet, the vibrator 22 moves to the right to cause a right-hand diaphragm 23a to project into a right-hand air chamber 34a and, on the other hand, to cause a left-hand diaphragm 23b to project outward from a left-hand air chamber 34b, as shown in FIG. 3A, as a magnetic force generated in the electromagnet 21 acts on the permanent magnets 31 and 32 in a half cycle of the alternating current. Thereupon, a suction valve 26a and a discharge valve 27a are closed and opened, respectively, in the right-hand air chamber 34a, so that compressed air is discharged through the discharge valve 27a. In the left-hand air chamber 34b, on the other hand, a suction valve 26b and a discharge valve 27b are opened and closed, respectively, so that air is sucked into the air chamber 34b.

Figure 3B:
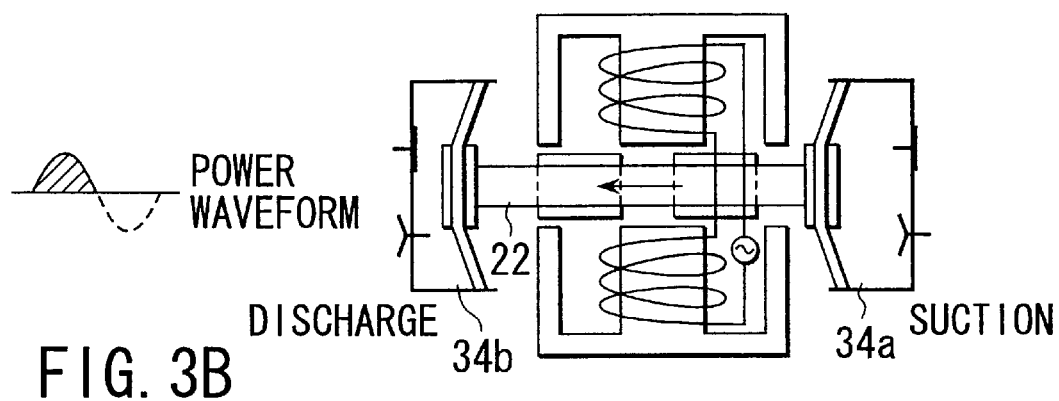

When the alternating current supplied to the coil 33 enters a half cycle opposite to the aforesaid one, the vibrator 22 moves to the left, as shown in FIG. 3B, and operation reverse to the aforesaid one is carried out. More specifically, compressed air is discharged from the left-hand air chamber 34b, and air is sucked into the right-hand air chamber 34a.

Figure 4:
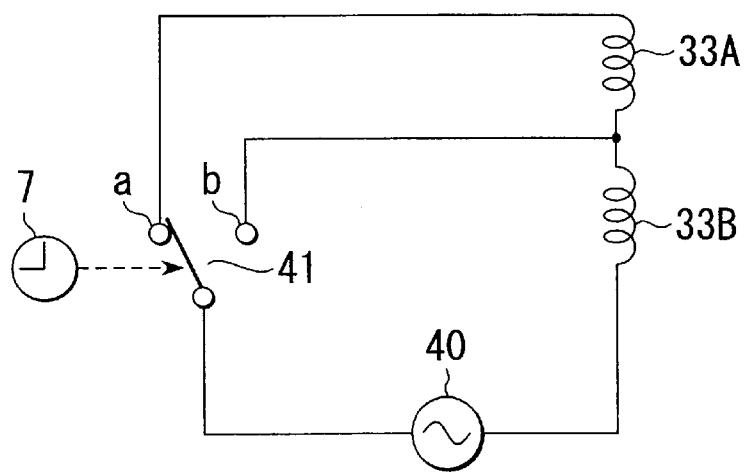
FIG. 4 is a circuit diagram showing the wiring of coils according to one embodiment of the present invention.

According to the present embodiment, an electric circuit of the coil 33 of the electromagnet 21 is constructed in the manner shown in FIG. 4. More specifically, coils 33A and 33B are connected through an AC power source 40 and a changeover switch 41 that is shifted in response to a signal from the timer 7. While the changeover switch 41 is connected to a terminal "a", current flows through the coils 33A and 33B that are connected in series with each other. When the switch is shifted to a terminal "b", current flows through the coil 33B only, and not through the coil 33A. The changeover switch 41 is connected to the terminal "a" when a septic tank is to be evacuated and connected to the terminal "b" during reverse cleaning operation.

The operation of the present embodiment will now be described with reference to FIGS. 5A and 5B. When the septic tank is to be aerated, the changeover switch 41 is connected to the terminal "a", as mentioned before, so that a serially-connected circuit of the coils 33A and 33B is formed in the manner shown in FIG. 5A. When the septic tank is subjected to reverse cleaning, on the other hand, the changeover switch 41 is connected to the terminal "b", so that a one-coil circuit that includes the coil 33B only is formed in the manner shown in FIG. 5B.

Figure 6:
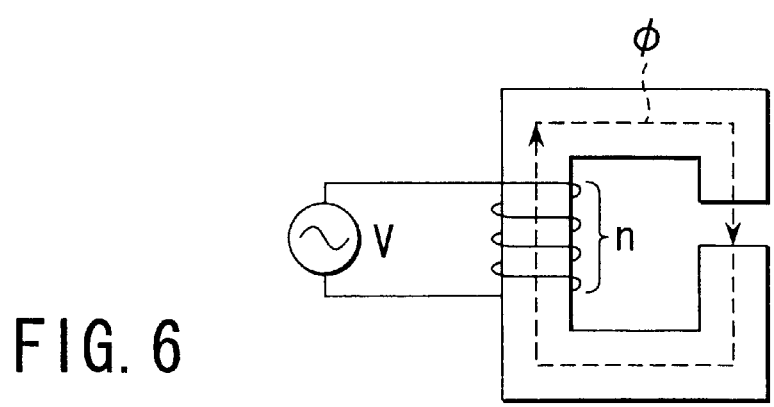
FIG. 6 is a diagram for illustrating the principle of operation of the present embodiment.

For a magnetic circuit shown in FIG. 6, the following expression is generally established:

$$V = n \cdot d\phi/dt, \quad (1)$$

where "n" is the number of windings, V is the voltage of the AC power source that is connected across the windings, and $\phi$ is a magnetic flux that is generated in the magnetic circuit.

Transforming expression (1), we obtain expression (2) as follows:

$$d\phi/dt = V/n, \phi = 1/n \cdot \int V dt. \quad (2)$$

Figure 5A:
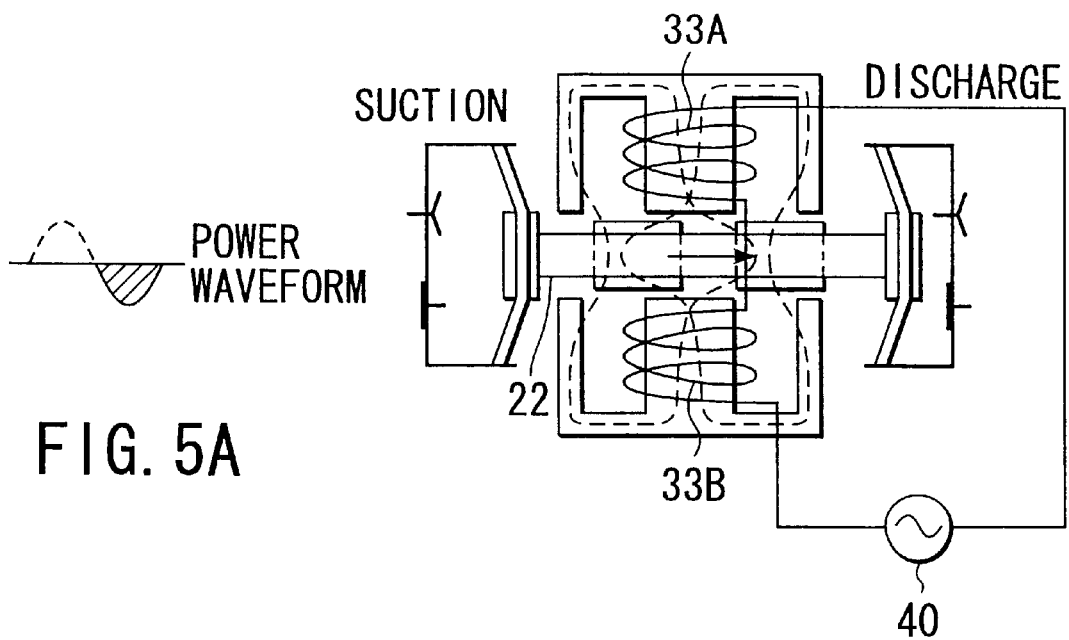
FIGS. 5A and 5B are diagrams for illustrating an energized state of electromagnet coils with switching means of FIG. 4 shifted.

The serially-connected circuit of the coils 33A and 33B of FIG. 5A will be reviewed. The Kirchhoff's law of expression (3) is established as follows:

$$\text{Magnetomotive Force} = Q \times \phi 1 = Q \times 1/2n \cdot \int V dt, \quad (3)$$

where "n" and "n", equal numbers, are the respective numbers of turns of the coils 33A and 33B, V is the voltage of the AC power source 40, Q is the magnetic resistance of the magnetic circuit, and $\phi 1$ is a magnetic flux.

Figure 5B:
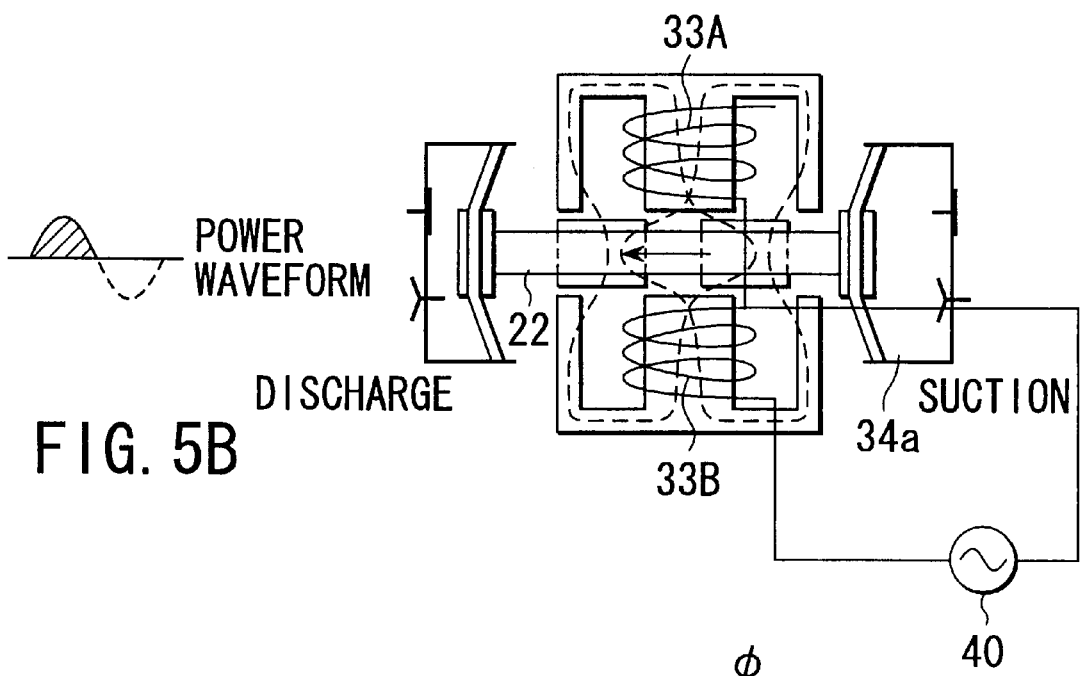

On the other hand, the one-coil circuit of FIG. 5B will be reviewed. The Kirchhoff's law of expression (4) is established in the same manner as aforesaid as follows:

$$\text{Magnetomotive Force} = Q \times \phi 2 = Q \times 1/n \cdot \int V dt, \quad (4)$$

where "n" is the number of turns of the coil 33B, V is the voltage of the AC power source 40, Q is the magnetic resistance of the magnetic circuit, and $\phi 2$ is a magnetic flux.

As is evident from the comparison between the above expressions (3) and (4), the one-coil circuit of FIG. 5B can produce a magnetomotive force of a magnitude twice as high as that of the serially-connected-coil circuit of FIG. 5A.

At the time of aeration, as seen from the above description, the changeover switch 41 of FIG. 4 is connected to the terminal "a", and the three-way change-over valve 3 for switching the passage for the compressed air discharged from the electromagnetic blower 2 is connected to the aerating pipe, as shown in FIG. 1. Accordingly, the compressed air formed by means of the diaphragms 23a and 23b that are driven by the magnetomotive force of expression (3) is supplied to an air diffuser pipe for aeration.

Then, at the time of reverse cleaning, the changeover switch 41 of FIG. 4 is connected to the terminal "b" for a period of time predetermined in response to a signal from the timer 7. Thereupon, the electromagnetic blower 2 drives the diaphragms 23a and 23b with the magnetomotive force of expression (4) that is twice as great as the force of expression (3), and compressed air is formed by means of the diaphragms 23a and 23b. As this point of time, the three-way change-over valve 3 of FIG. 1 is shifted so as to be connected to the reverse cleaning pipe, so that the compressed air is supplied to the air diffuser pipe for aeration through this pipe. Since the throttle valve 6 is connected between the aerating and reverse cleaning pipes, some of the compressed air is bypassed to the other pipe through the throttle valve 6 while the compressed air is being supplied to the one pipe. Accordingly, the pressure in the air diffuser pipe that is connected to the other pipe becomes higher than water pressure, so that there is no possibility of sewage flowing back into the air diffuser pipe and clogging it.

Figure 7:
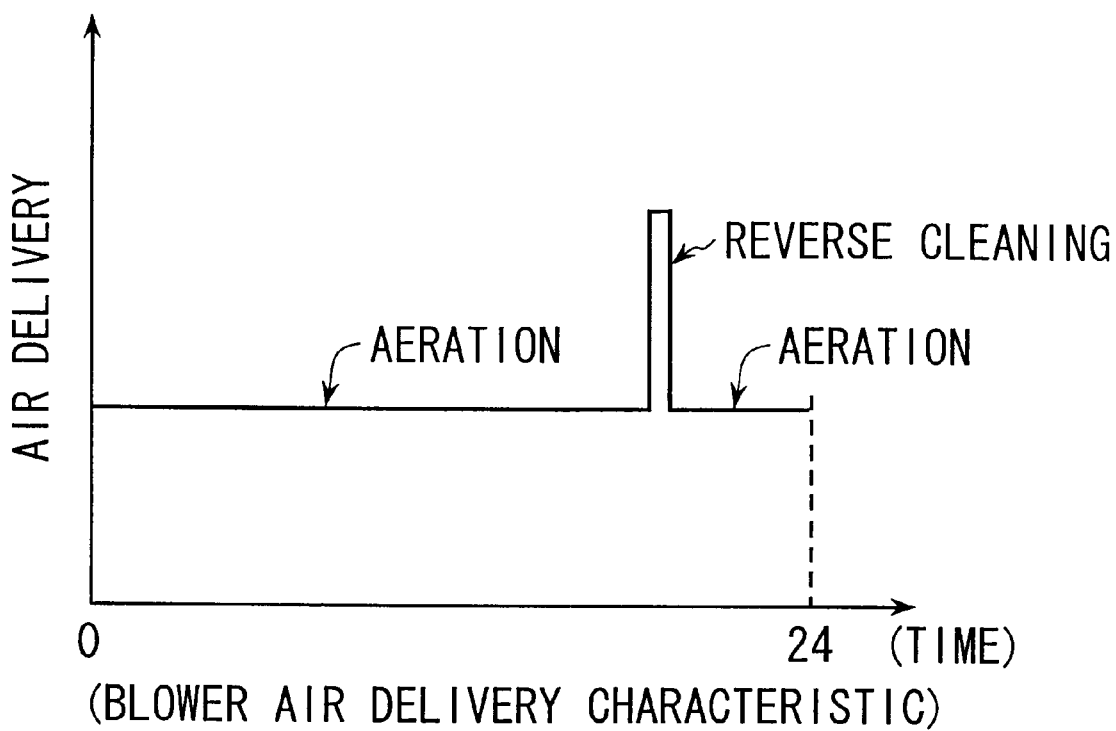
FIG. 7 is a diagram showing a blower air delivery characteristic according to the present embodiment.

According to the present embodiment, as described above, the force of the compressed air during the reverse cleaning can be made about twice as great as the force of the compressed air during the aeration, as shown in FIG. 7, by only preparing the simple circuit configuration shown in FIG. 4. Further, the electromagnetic blower can be operated with about half its rated capacity during the aeration period that occupies most hours of each day, and the electromagnetic blower can be operated with high output near its rating only during the reverse cleaning period that occupies a short time (e.g., 10 minutes a day) of each day. During the aeration period, therefore, the electromagnetic blower can be operated silently, and the life of the electromagnetic blower can be lengthened.

Figure 8:
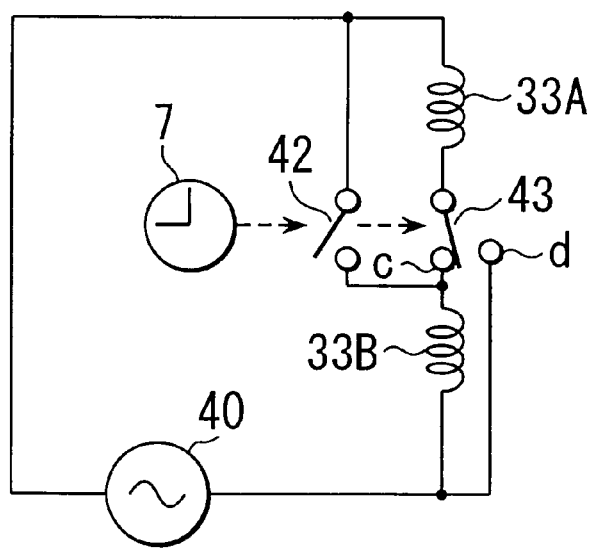
FIG. 8 is a circuit diagram showing the wiring of coils according to a second embodiment of the present invention.
Figure 9A:
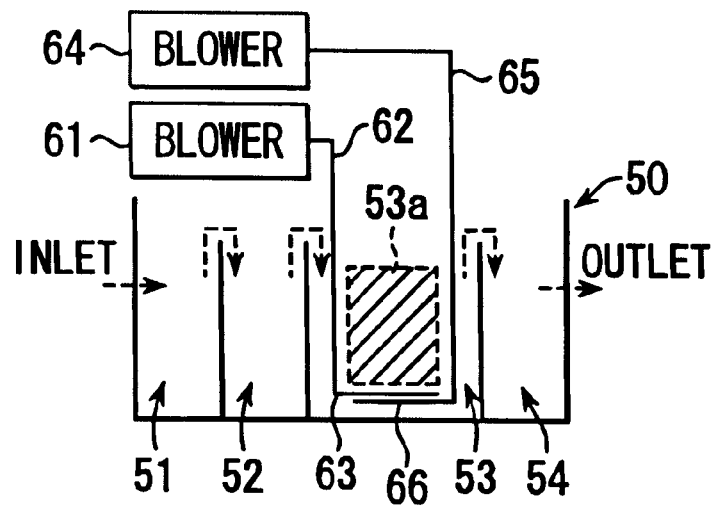
FIGS. 9A to 9C are diagrams conventional sewage disposal facilities.
Figure 9B:
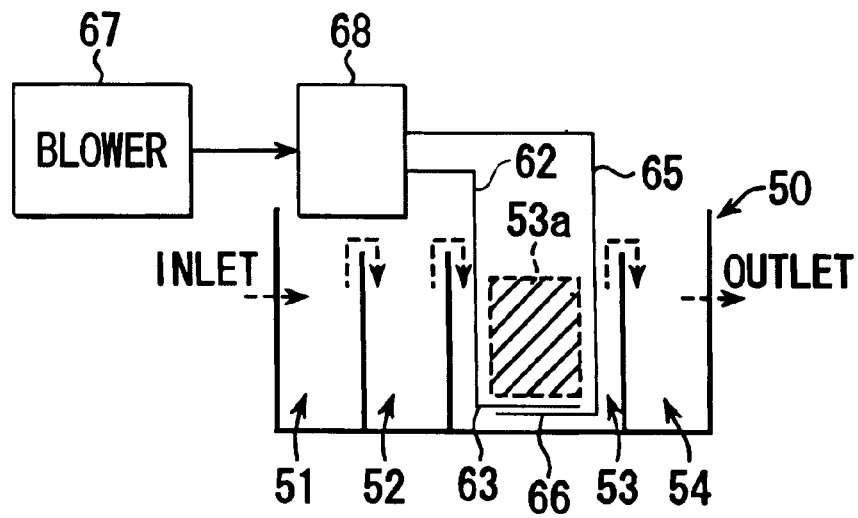
Figure 9C:
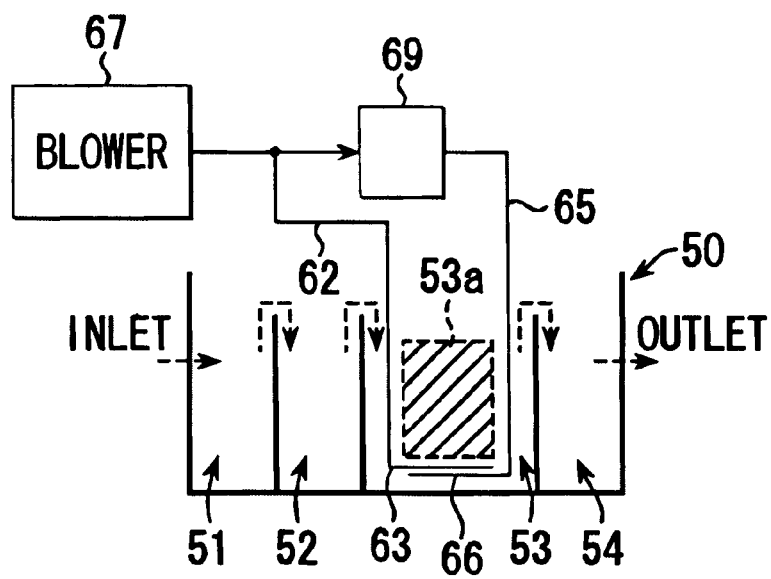

A second embodiment of the present invention will now be described with reference to FIG. 8. As shown in the drawing, this embodiment is designed so that a first switch 42 is provided in parallel with the coil 33A, and a second switch 43 is provided between the coils 33A and 33B. During aeration, the first switch 42 is turned off, the second switch 43 is connected to a terminal "c", and the coils 33A and 33B are connected in series with each other, as shown in the drawing. During reverse cleaning operation, the first switch 42 is turned on, the second switch 43 is connected to a terminal "d", and the coils 33A and 33B are connected in parallel with each other.

In this embodiment, as in the first embodiment, the blower can be operated with low output during aeration and with high output near its rating during reverse cleaning operation, so that the same effect of the first embodiment can be expected.

Although the coil of the blower is divided in two in each of the foregoing embodiments, the present invention is not limited to these embodiments, and the coil may be divided in three.

According to the present invention, as described above, the path of the alternating current supplied to the coil of the electromagnet of the electromagnetic blower can be alternatively switched between a line through which the current is supplied to the entire coil and a line through which the current is supplied to only a part of the coil. Thus, simple, low-priced means can provide an electromagnetic blower with two outputs, high and low. If the low and high outputs of the electromagnetic blower are used for aeration and reverse cleaning, respectively, moreover, silent operation can be enjoyed for most hours of each day, and the life can be lengthened.

According to the present invention, moreover, the throttle valve is connected between the pipes for guiding compressed air to the air diffuser pipe for aeration and the air diffuser pipe for reverse cleaning. Therefore, the internal pressure of the other air diffuser pipe cannot become lower than the water pressure while the compressed air is being supplied to one of the air diffuser pipes for aeration and reverse cleaning, so that sewage can be prevented from flowing back into the other air diffuser pipe. Thus, the air diffuser pipes can be prevented from being clogged with sewage. Furthermore, the efficiency of reverse cleaning can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electromagnetic blower for supplying aeration air into a septic tank, comprising:
    an electromagnet having a core, a first coil wound around the core, and a second coil wound around the core and connected in series to the first coil;
    a reciprocating vibrator when driven by a magnetic force of the electromagnet, which is generated from an alternating current supplied to the first and second coils;
    a diaphragm attached to an end of the vibrator, for discharging compressed air;
    switching means for supplying the alternating current to one of the first and second coils; and
    a timer for driving the switching means,
    wherein the switching means supplies the alternating current to both the first and second coils so that the blower operates in a first mode to supply aeration air into the septic tank, and the switching means temporarily supplies, in response to a control signal from the timer, the alternating current to only one of the first and second coils so that the blower temporarily operates in a second mode to supply reverse-cleaning air into the septic tank.

2. A two-passage air supply apparatus comprising: an electromagnetic blower for supplying aeration air into a septic tank, comprising an electromagnet having a core, a first coil wound around the core, and a second coil wound around the core and connected in series to the first coil; a reciprocating vibrator when driven by a magnetic force of the electromagnet, which is generated from an alternating current supplied to the first and second coils; a diaphragm attached to an end of the vibrator, for discharging compressed air; switching means for supplying the alternating current to one of the first and second coils; and a timer for driving the switching means, wherein the switching means supplies the alternating current to both the first and second coils so that the blower operates in a first mode to supply aeration air into the septic tank, and the switching means temporarily supplies, in response to a control signal from the timer, the alternating current to only one of the first and second coils so that the blower temporarily operates in a second mode to supply reverse-cleaning air into the septic tank,
    a first air diffuser pipe for aeration for sewage purification;
    a second air diffuser pipe for reverse cleaning; and
    a switching valve for supplying compressed air from the electromagnetic blower to a selected one of the air diffuser pipes,
    wherein the compressed air is supplied to both the first air diffuser pipe and the second diffuser pipe while the electromagnetic blower is operating in the second mode.

3. The apparatus according to claim 2, further comprising an air-guiding pipe for guiding the compressed air from the electromagnetic blower to the first and second air diffuser pipes and a throttle valve provided on the air-guiding pipe.

* * * * *